(12) United States Patent
Yoon et al.

(10) Patent No.: US 7,564,499 B2
(45) Date of Patent: Jul. 21, 2009

(54) ILLUMINATION DEVICE FOR VIDEO PRESENTER AND VIDEO PRESENTER HAVING THE SAME

(75) Inventors: Yong-gyu Yoon, Seongnam-si (KR); Seung-yeob Lee, Seongnam-si (KR); Myung-ho Yoo, Seongnam-si (KR)

(73) Assignee: Samsung Techwin Co., Ltd. (KR)

( * ) Notice: Subject to any disclaimer, the term of this patent is extended or adjusted under 35 U.S.C. 154(b) by 612 days.

(21) Appl. No.: 11/034,380

(22) Filed: Jan. 12, 2005

(65) Prior Publication Data

US 2006/0152639 A1  Jul. 13, 2006

(51) Int. Cl.
*H04N 5/225* (2006.01)
(52) U.S. Cl. ...................................... 348/373
(58) Field of Classification Search ................. 348/371, 348/373, 143; D16/232, 231, 234, 235, 236; D14/423; 396/5; 349/6; 362/226
See application file for complete search history.

(56) References Cited

U.S. PATENT DOCUMENTS

| | | | | |
|---|---|---|---|---|
| 4,134,105 A | * | 1/1979 | Stadler | 355/64 |
| 5,029,057 A | * | 7/1991 | Devir et al. | 362/645 |
| D352,502 S | * | 11/1994 | Hasegawa | D14/423 |
| 6,048,097 A | * | 4/2000 | Heinze | 378/206 |
| 6,317,155 B1 | * | 11/2001 | Ohyama | 348/373 |
| D493,812 S | * | 8/2004 | Mudd et al. | D16/235 |
| D495,355 S | * | 8/2004 | Mudd et al. | D16/232 |
| 6,969,033 B2 | * | 11/2005 | van der Linden | 248/177.1 |
| 7,050,106 B2 | * | 5/2006 | Nagano | 348/373 |
| 2003/0133013 A1 | * | 7/2003 | Maeda et al. | 348/143 |
| 2004/0052516 A1 | * | 3/2004 | Mulcahey | 396/422 |
| 2005/0168627 A1 | * | 8/2005 | Yi et al. | 348/373 |

FOREIGN PATENT DOCUMENTS

| | | |
|---|---|---|
| JP | 08-186743 | 7/1996 |
| JP | 09-205527 | 8/1997 |
| JP | 09-205566 | 8/1997 |
| JP | 2000-138796 | 5/2000 |

* cited by examiner

*Primary Examiner*—Tuan V Ho
*Assistant Examiner*—Kent Wang
(74) *Attorney, Agent, or Firm*—Park & Associates IP Law LLC

(57) ABSTRACT

A video presenter includes a table, a supporting base disposed at one side of the table, a support arm formed in a generally arch shape and rotatably coupled to the supporting base, a camera head rotatably coupled at an upper end of the support arm, a lamp holder attached to an inwardly facing surface of the support arm, and a lamp unit rotatably coupled to the lamp holder and including a lamp cover having a curved inner surface with a varying radius of curvature. The lamp cover may have a plurality of prisms at its inner surface.

24 Claims, 13 Drawing Sheets

ILLUMINATION DEVICE FOR VIDEO PRESENTER AND VIDEO PRESENTER HAVING THE SAME

BACKGROUND OF THE INVENTION

1. Field of the Invention

The present invention relates to a video presenter, more particularly, to an illumination device for illuminating a target object placed on a video presenter.

2. Description of the Related Art

Video presenters are devices that input and display an image of a target object taken typically by a charge coupled device (CCD) camera on a display unit for academic or commercial purposes. Particularly, a video presenter can obtain an enlarged image of the target object taken from the CCD camera by coupling a magnifying lens to the CCD camera and can display the enlarged image of the target object on the display unit. The video presenter may include an illumination device for improving the definition of an image of the target object taken by the CCD camera. The illumination device should appropriately illuminate the target object while preventing itself from interfering with a camera head of the CCD camera. The illumination device is typically designed to have a compact size and a simple structure for easy manipulation or to save the manufacturing cost.

FIG. 1 is a perspective view of a typical video presenter. Referring to FIG. 1, a video presenter includes first and second camera support arms 12 and 13 connected together and disposed at one side of a table 11, a camera head 15 supported by the first and second camera support arms 12 and 13, first and second lamp supporters 16 and 17 disposed at opposite lateral sides of the table 11, and first and second lamps 18 and 19 supported by the first and second lamp support arms 16 and 17, respectively. The first and second camera support arms 12 and 13 are mounted to table 11 of the video presenter so that the second camera support arm 13 can rotate with respect to the first camera support arm 12 about a rotation axis or pivot shaft 14. The lower end of the first camera support arm 12 is rotatably fixed to the table 11. The first and second lamp supporters 16 and 17 are fixed to the table 11 so that their lower ends can be rotated and tilted laterally. The camera head 15 is rotatably supported by the second camera support arm 13 at the upper end thereof. The first and second lamps 18 and 19 are rotatably fixed to the first and second lamp supporters 16 and 17 at the upper ends thereof, respectively.

FIG. 2 is a front view of the video presenter of FIG. 1 with the lamp directed in an illumination position. Referring to FIG. 2, the first and second lamp supporters 16 and 17 can be adjusted to tilt about a horizontal plane so that they can form a predetermined angle a with the horizontal plane. Accordingly, light emitted from the first and second lamps 18 and 19 can be appropriately distributed on the top surface of the table 11 by lifting, lowering, or tilting the first and second lamp supporters 16 and 17.

The video presenter of FIGS. 1 and 2 can provide an optimum illumination to the target object by allowing a user to freely lift or lower or adjust the first and second lamp supporters 16 and 17. However, when adjusting the first and second lamp supporters 16 and 17, rotation joints on the first and second lamp supporters 16 and 17 rub against the first and second lamp supporters 16 and 17. Therefore, after a long period of use, the rotation joints may substantially be worn out or loosened.

Japanese Patent Application Publication No. 8-186743 discloses a video presenter, in which an illumination device is provided at only one side of a target object. With this illumination device, however, light cannot be evenly distributed throughout the target object area. Moreover, as the intensity of illumination is inversely proportional to a square of the distance between the target object and the illumination device, the closer a portion of the target object is to the illumination device, the more the portion of the target object is illuminated. Likewise, the farther a portion of the target object is from the illumination device, the less the portion of the target object is illuminated. In addition, the intensity of illumination varies depending on an incidence angle of light emitted from the illumination device. Therefore, in such a device where the illumination device is provided at only one lower side of the target object, it is difficult to apply light to the target object with an adequate incidence angle.

In addition, the video presenter disclosed in Japanese Patent Application Publication No. 8-186743 illuminates the target object with a reflection plate which reflects light emitting from a light source. The reflection plate should be positioned above the target object in order to properly illuminate the target object. However, because the reflection plate is fixed on the table of the video presenter, it is not intended to adjust its orientation for a better illumination. Thus, if the operator attempts to adjust the reflection plate, she can be injured by the reflection plate or the reflection plate may be damaged or deformed beyond its design limit.

Japanese Patent Application Publication Nos. 9-205527 and 9-205566 each disclose a video presenter, in which a light source is mounted in the vicinity of the lens in a camera head. Since the light source is a distance apart from a target object, the target object may suffer from lack of sufficient illumination. Thus, there is a strong need to increase the illumination intensity of the light source. In order to increase the illumination intensity of the light source, however, a considerable amount of energy should be consumed, which may often cause noises in circuits near an optical photographing system. In addition, there is also a possibility of image deformations especially when the surface of the target object is reflective.

Japanese Patent Application Publication No. 2000-138796 discloses a video presenter using a light emitting diode (LED) as light source. Given that an LED only emits a small amount of light, many LEDs are necessary to provide a sufficient amount of light to the target object. In addition, a convex lens should be coupled to each of the LEDs. Moreover, a prism element should also be coupled to each of the LEDs in order to disperse or collect light radiated from the LEDs. Therefore, the structure of the video presenter inevitably becomes complicated, which results in an increase in the manufacturing costs of the video presenter.

For a video presenter, in order to illuminate a target object with sufficient light, it is more important to evenly and adequately distribute light radiated from an illumination device over the entire surface of the target object rather than focusing a considerable amount of light on only a central portion of the target object.

SUMMARY OF THE INVENTION

The present invention provides an illumination device for a video presenter and a video presenter having the illumination device.

The present invention also provides an illumination device for a video presenter, which can distribute illumination light over the outer surface of a target object more evenly so that different portions of the object can be rendered with almost the same illumination intensity, and a video presenter having the illumination device.

The present invention also provides a video presenter and an illumination device for the video presenter, which is easy to keep and manipulate.

According to one aspect of the invention, a video presenter comprises: a table, a support arm extending generally upwardly and rotatably coupled to the table, a camera head rotatably attached at an upper end of the support arm, and an illumination device rotatably attached at an inwardly facing surface of the support arm.

The table may have a generally circular and flat shape.

The video presenter may include a supporting base at a lateral side of the table, and the support arm be rotatably coupled to the supporting base.

The illumination device preferably includes a lamp holder attached at the inwardly facing surface of the support arm, and a lamp unit rotatably coupled to the lamp holder.

The support arm may have a generally arch-like shape.

The illumination device preferably includes a lamp holder attached at the inwardly facing surface of the generally arch shaped support arm, and a lamp unit rotatably coupled to the lamp holder, the lamp unit including a lamp cover formed of a substantially transparent or translucent material.

The lamp cover preferably has an inner surface with varying or different radiuses of curvature. The curved inner surface of the lamp cover is preferably a concave surface.

The varying or different curvature of the lamp cover may be arranged along a longitudinal direction of the lamp cover, and the curvature at a central portion of the lamp cover is different from the curvature two lateral portions of the lamp cover.

The varying or different curvature of the lamp cover may be determined so that light from the lamp unit can be distributed over a target object on the table with a substantially uniform illumination intensity.

The lamp unit preferably includes a lamp base coupled to the lamp cover so that an empty space is formed there-between, a reflection plate installed in the empty space formed between the lamp base and the lamp cover and, the reflection plate having a pair of concave reflective surfaces, and a pair of lamps disposed about the respective concave reflective surfaces.

Each of the pair of concave reflective surfaces of the reflection plate may be formed so that a straight line extending from the center of curvature of the concave reflective surface to the center point in the arc range of the corresponding concave reflective surface tilts by a degree with respect to a straight line vertically extending from the center point in the arc range of the corresponding concave reflective surface.

Each of the lamps may be arranged so that the center of the lamp tilts with respect to a straight line vertically extending from the center point in the arc range of the respective concave reflective surfaces.

The video presenter may further comprise a rotator coupled to the lamp holder and the lamp unit for enabling rotation of the lamp unit relative to the lamp holder, and a stopper coupled to the rotator and configured to provide limits on the rotation of the lamp unit relative to the lamp holder.

The lamps may be cold cathode fluorescent lamps.

According to another aspect of the invention, the lamp cover has a plurality of prisms formed at an inner surface of the lamp cover. Each of the prisms preferably includes a horizontal surface, a vertical surface vertically extending downward from one side of the horizontal surface, and a slanting surface slantingly extending downward from the other side of the horizontal surface. A cross-sectional shape of each of the prisms may be determined so that light from the lamp unit can be distributed over a target object on the table with a substantially uniform illumination intensity.

According to another aspect of the invention, an illumination device for a video presenter comprises: a lamp holder having a lamp holder base with a convex outer surface, and a lamp holder cover coupled to said lamp holder base and providing a flat surface, and a lamp unit having a lamp base rotatably coupled to the lamp holder cover, a lamp cover coupled to the lamp base so that an empty space is formed there-between, the lamp cover having a curved inner surface with a varying radius of curvature, a reflection plate installed in the empty space formed between the lamp base and the lamp cover, the reflection plate having a pair of concave reflective surfaces, and a pair of lamps respectively disposed on the concave reflective surfaces.

The illumination device preferably includes a rotator coupled to the lamp holder and the lamp unit for enabling rotation of the lamp unit relative to the lamp holder, and a stopper coupled to the rotator and configured to provide limits on the rotation of the lamp unit relative to the lamp holder.

According to another aspect of the invention, an illumination device for a video presenter comprises: a lamp holder having a lamp holder base with a curved outer surface, and a lamp holder cover coupled to the lamp holder base and providing a flat surface; and a lamp unit having a lamp base rotatably coupled to the lamp holder cover, a lamp cover coupled to the lamp base so that an empty space is formed there-between, the lamp cover having a plurality of prisms formed on an inner surface thereof, a reflection plate installed in the empty space formed between the lamp base and the lamp cover, the reflection plate having a pair of concave reflective surfaces, and a pair of lamps respectively disposed on the concave reflective surfaces.

The illumination device preferably includes a rotator coupled to the lamp holder and the lamp unit for enabling rotation of the lamp unit relative to the lamp holder, and a stopper coupled to the rotator and configured to provide limits on the rotation of the lamp unit relative to the lamp holder.

BRIEF DESCRIPTION OF THE DRAWINGS

The above and other features, aspects, and advantages of the present invention will become more apparent by describing in detail exemplary embodiments thereof with reference to the attached drawings in which.

DETAILED DESCRIPTION OF PREFERRED EMBODIMENTS

The present invention will now be described more in details with reference to the accompanying drawings, in which exemplary embodiments of the present invention are shown.

Figure 1:
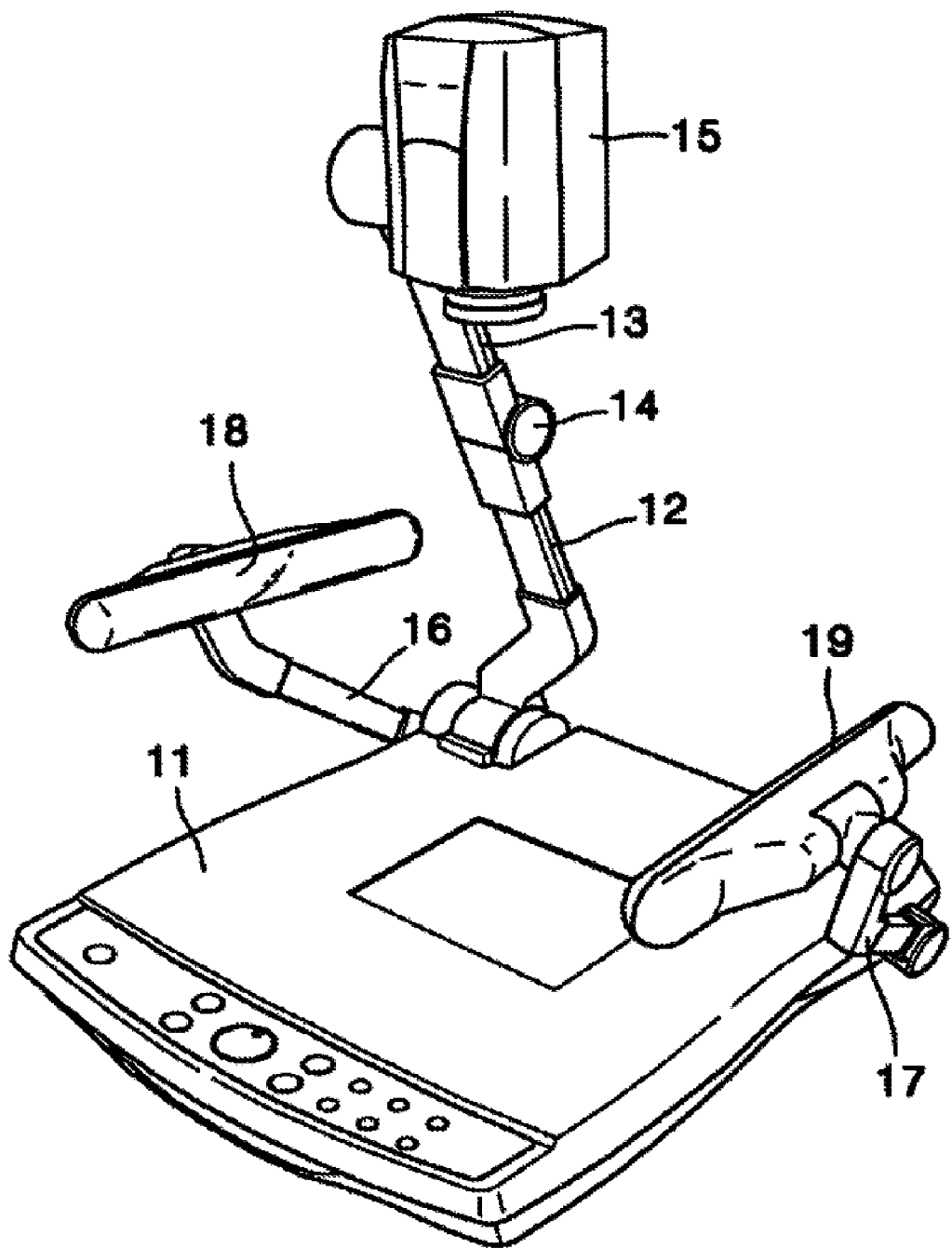
FIG. 1 is a perspective view of a typical video presenter.
Figure 2:
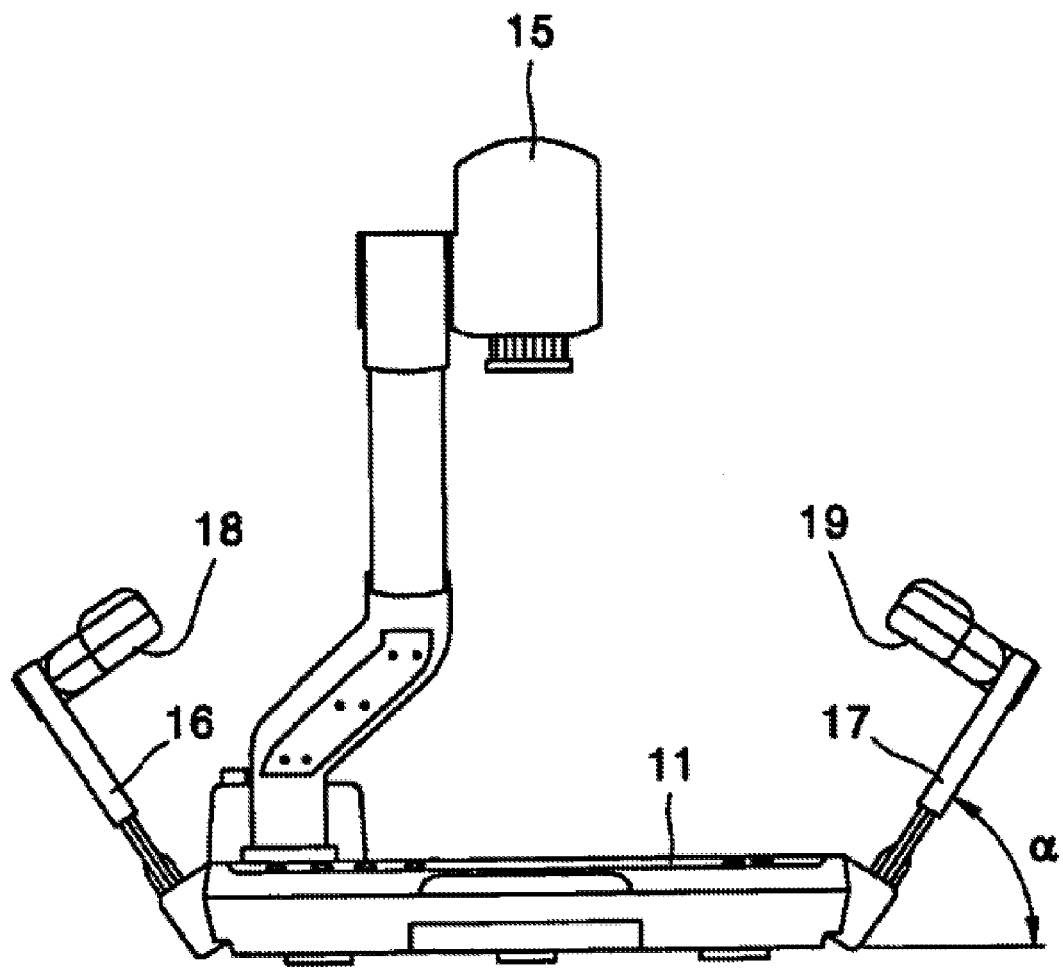
FIG. 2 is a front view of the typical video presenter of FIG. 1.
Figure 3:
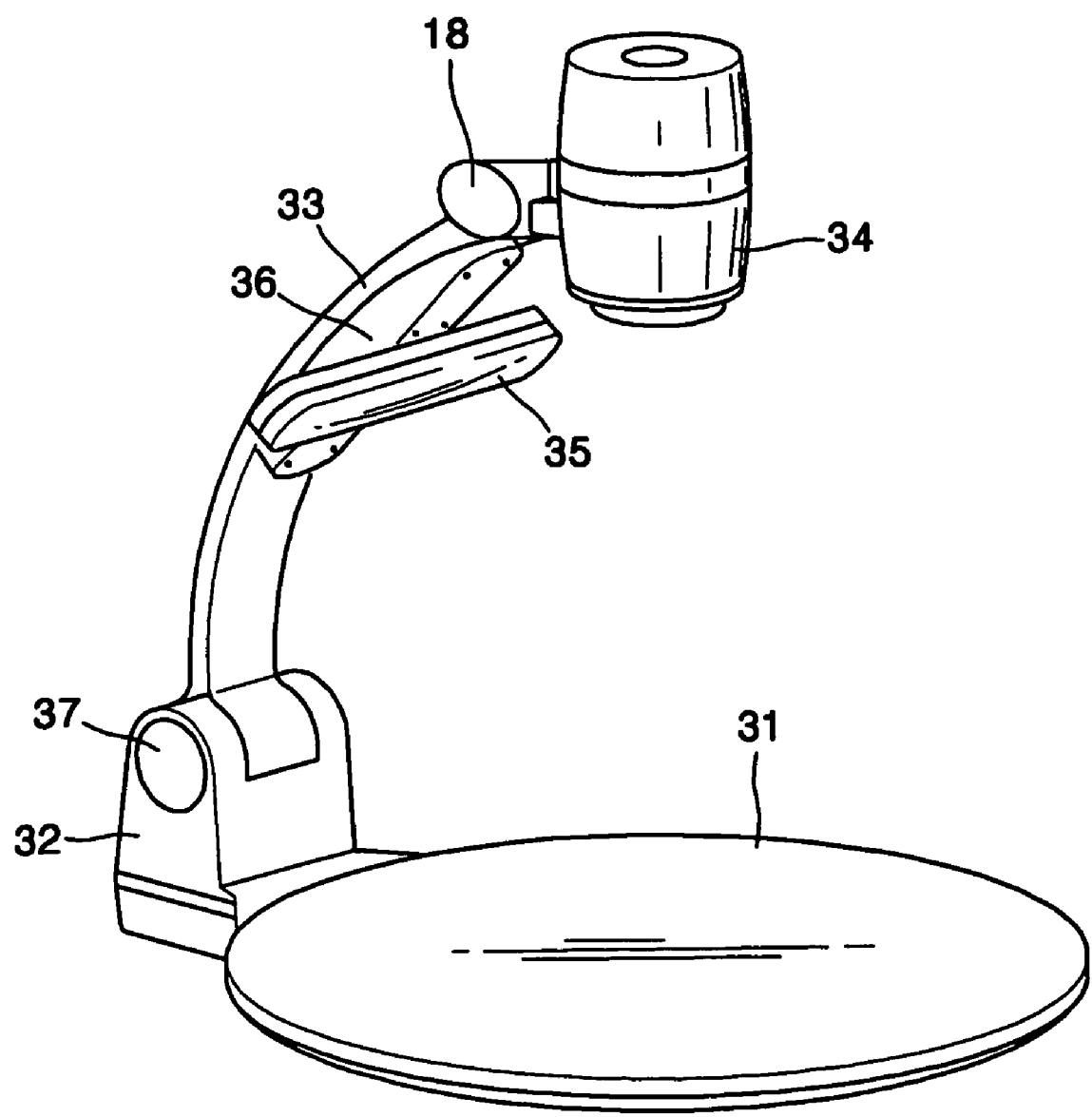
FIG. 3 is a perspective view of a video presenter according to one exemplary embodiment of the present invention.
Figure 4:
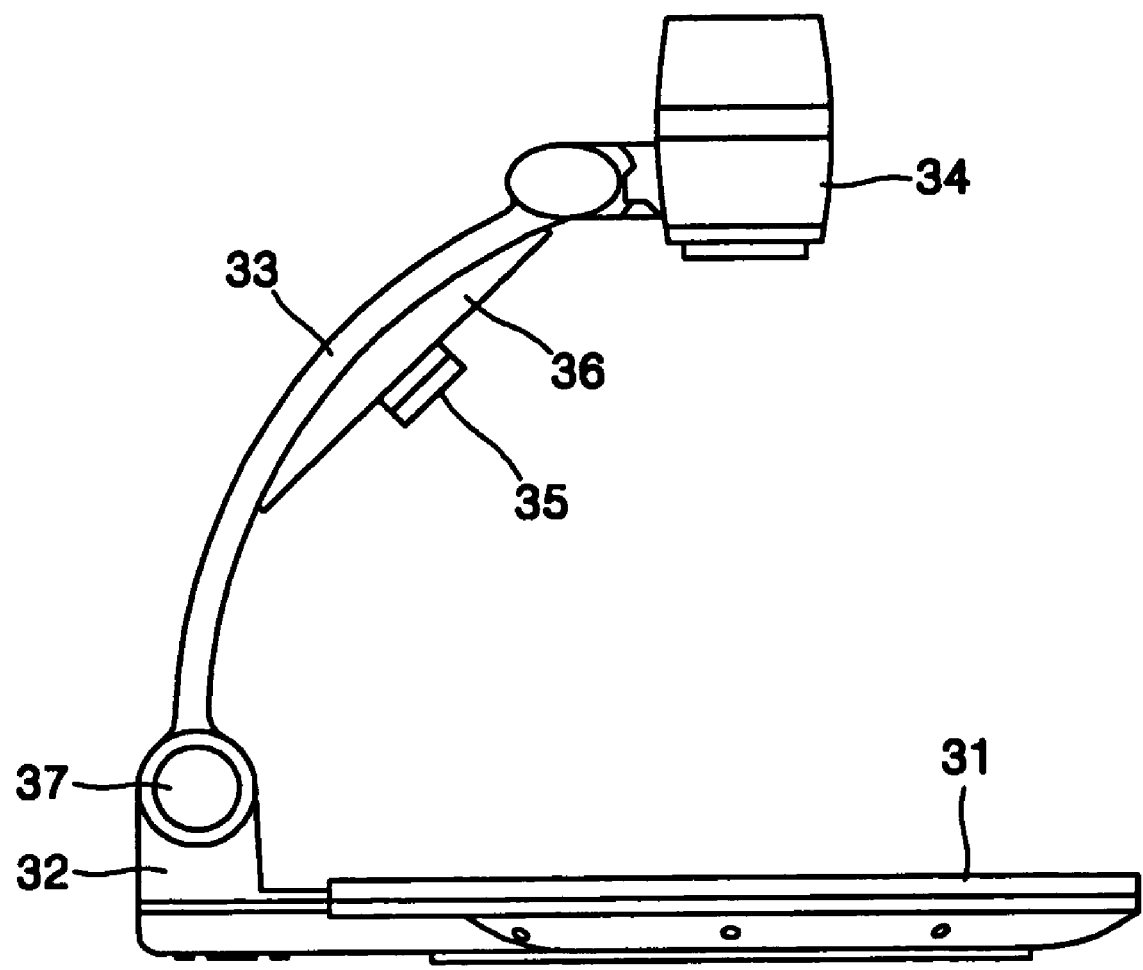
FIG. 4 is a side view of the video presenter of FIG. 3.

FIG. 3 is a perspective view of a video presenter according to one exemplary embodiment of the present invention. FIG. 4 is a side view of the video presenter of FIG. 3, and FIG. 5 is a plan view of the video presenter of FIG. 3.

Referring to FIG. 3, the video presenter includes a table 31 formed generally in a circular and flat shape for placing an object thereon, a supporting base 32 at one lateral side of the table 31, a support arm 33 rotatably coupled to the supporting base 32 and preferably formed in a generally arch-like shape, and a camera head 34 rotatably coupled to an upper end of the support arm 33. The support arm 33 is pivotally connected to the supporting base 32 so that it can rotate about a pivot shaft 37. The camera head 34 is pivotally connected to the support arm 33 so that it can rotate about a pivotable shaft 18.

An illumination device is mounted on an inwardly facing surface (i.e., a surface facing toward the table 31) of the support arm 33. The illumination device includes a lamp holder 36 which is fixed at an optimal location on the inwardly facing surface of the support arm 33, and a lamp unit 35 which is rotatably attached on the lamp holder 36. The illumination device of the present invention will be described later more in details with reference to the accompanying drawings.

Figure 5:
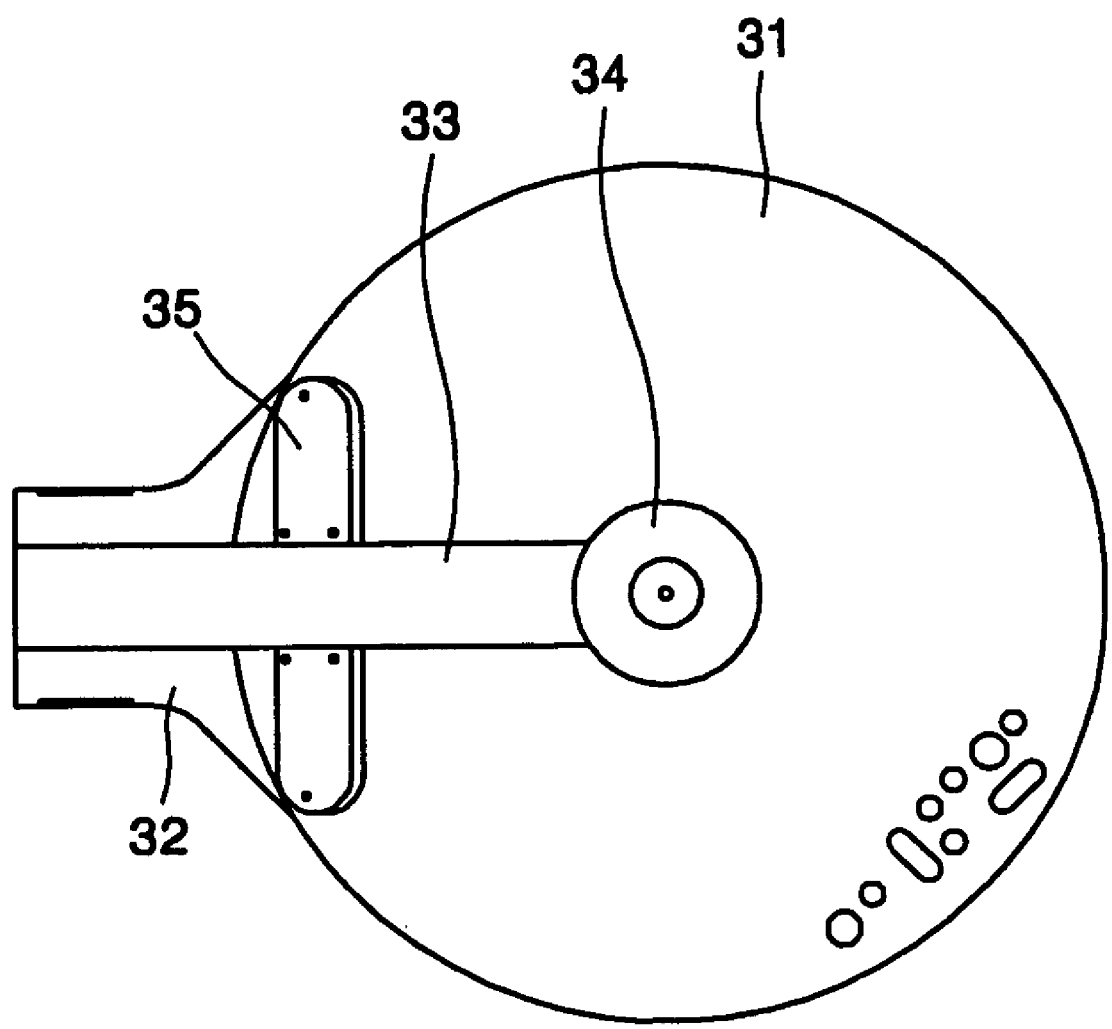
FIG. 5 is a top view of the video presenter of FIG. 3.

Referring to FIGS. 4 and 5, an overall construction and structural relationship among the table 31, the camera head 34, the lamp holder 36, and the lamp unit 35 is further described herein. As shown, the camera head 34 can be placed right above a central portion of the table 31 by rotating the support arm 33 about the pivot shaft 37. The lamp unit 35 can be rotated so that it can be arranged either in parallel to or in perpendicular to the lamp holder 36, or alternatively in other orientations if desired. The lamp holder 36 is fixed at an optimal location to an upper portion of the support arm 33, and thus the lamp unit 35 mounted on the lamp holder 36 can face the centre of the table 31 in a slanting or oblique direction.

Figure 6:
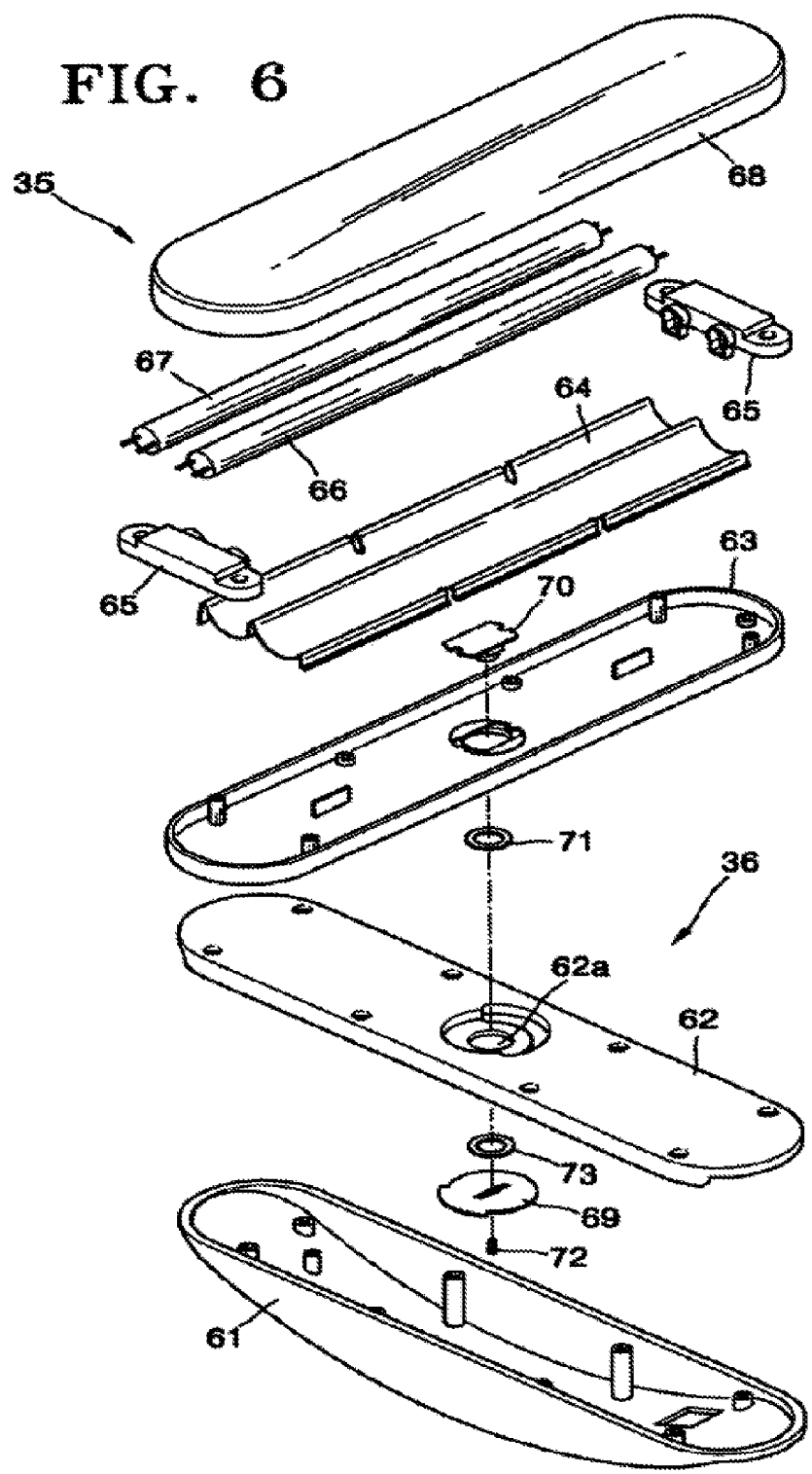
FIG. 6 is an exploded perspective view of the illumination device for the video presenter of FIG. 3.

FIG. 6 is an exploded perspective view of the illumination device of FIG. 3. Referring to FIG. 6, the illumination device includes the lamp holder 36 and the lamp unit 35, which is rotatably attached on the lamp holder 36. The lamp holder 36 includes a lamp holder base 61 and a lamp holder cover 62, which is coupled to the lamp holder base 61. As can be seen from FIG. 4, the lamp holder base 61 is formed to have a convex surface corresponding to a concave curvature of the support arm 33 so that it can fit in the support arm 33 with the convex surface of the lamp holder base 61 being in firm contact with the inward surface of the support arm 33. The lamp holder cover 62 and the lamp holder base 61 form an empty space therebetween when coupled to each other.

The lamp unit 35 includes a lamp base 63 rotatably attached on the lamp holder cover 62, and a lamp cover 68 coupled to the lamp base 63 with an empty space formed therebetween. The lamp unit 35 further includes a reflection plate 64 installed in the empty space formed between the lamp base 63 and the lamp cover 68 and having a unique cross sectional shape as shown, and a pair of lamps 66 and 67 arranged along the reflection plate 64 in parallel to each other. Power is supplied to the first and second lamps 66 and 67 by connecting electric terminals of the first and second lamps 66 and 67 to electric connectors 65 which are fixed at lateral sides of the lamp base 63. Preferably, but not necessarily, the first and second lamps 66 and 67 are cold cathode fluorescent lamps (CCFLs).

For the rotatable connection of the lamp unit 35 with the lamp holder 36, suitable rotation means are provided, such as a rotator 70 and a stopper 69. The rotator 70 is fixably coupled to the inside of the lamp base 63, and a terminal cylindrical portion of the rotator 70 extends through the lamp base 63. The cylindrical portion of the rotator 70 projecting out of the lamp base 63 is inserted into an insertion hole 62a of the lamp holder cover 62. Therefore, when the rotator 70 rotates in the insertion hole 62a, the lamp base 63 fixed to the rotator 70 can rotate together with the rotator 70. The stopper 69 is connected to the cylindrical portion of the rotator 70 by a screw 72 so that the stopper 69 can rotate when the rotator 70 rotates in the insertion hole 62a. However, the stopper 69 stops rotating when it becomes in contact with a molding portion (not shown) formed at an inner side of the lamp holder cover 62. When the stopper 69 stops rotating, the rotator 70 also stops rotating, which limits rotation of the lamp base 63. Accordingly, the lamp base 63 can rotate from a position where it is arranged in parallel to the lamp holder cover 62 to a position where it makes a right angle with the lamp holder 62. Reference numerals 71 and 73 represent washers preferably used for the connection of the lamp unit 35 with the lamp holder 36.

Figure 7:
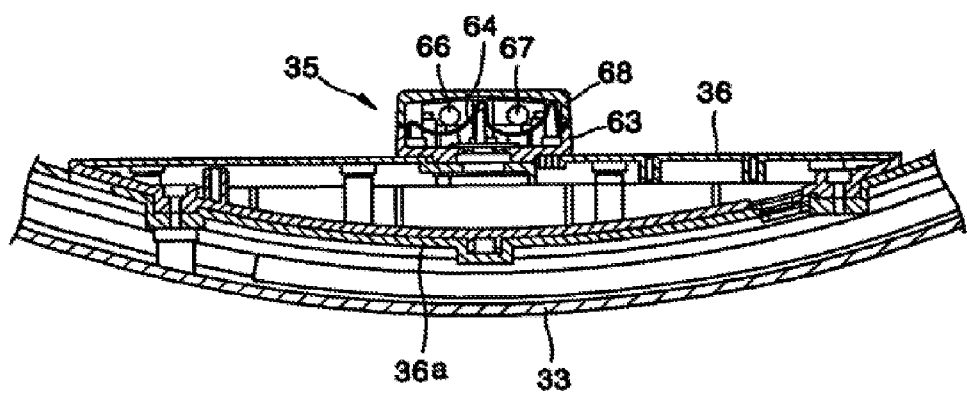
FIG. 7 is a cross-sectional view of the illumination device of FIG. 6 coupled with a support arm of the video presenter.

FIG. 7 is a cross-sectional view of the illumination device of FIG. 6 coupled to the support arm 33. Referring to FIG. 7, the lamp holder 36 is mounted on the support arm 33, and the lamp unit 35 is coupled onto the lamp holder 36 making a right angle with the lamp holder 36. The lamp holder 36 has a convex surface 36a, which corresponds to a concave surface of the support arm 33. The reflection plate 64 and the first and second lamps 66 and 67 are provided inside the lamp unit 35.

Figure 8:
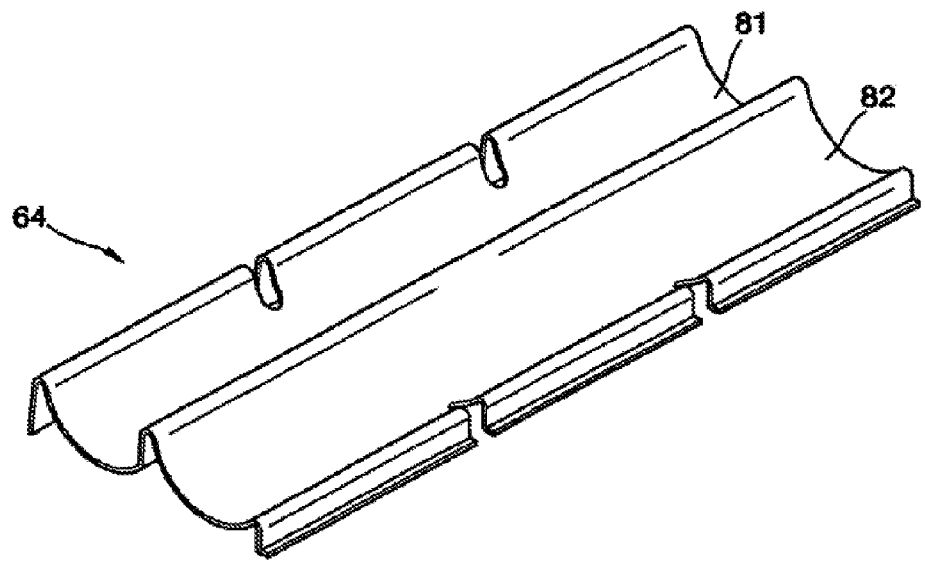
FIG. 8 is a perspective view of a reflection plate of FIGS. 6 and 7.

FIG. 8 is a perspective view of the reflection plate 64 of FIG. 6 or 7. Referring to FIG. 8, the reflection plate 64 is composed of a pair of concave reflective surfaces 81 and 82. The first and second lamps 66 and 67 are to be positioned along the concave reflective surfaces 81 and 82, respectively, so that the concave reflective surfaces 81 and 82 can reflect light emitting from the first and second lamps 66 and 67. The concave reflective surfaces 81 and 82 are formed to have preferably the same radius of curvature.

Figure 9:
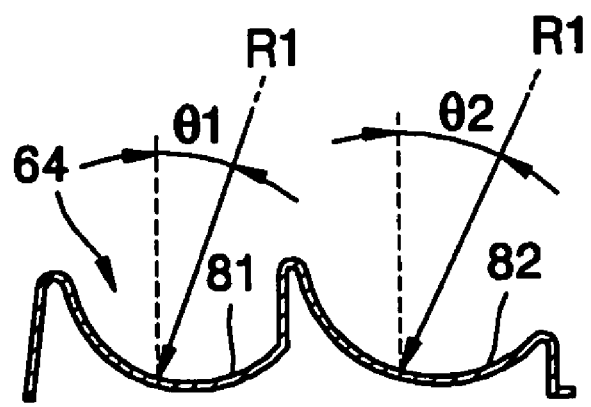
FIG. 9 is a cross-sectional view of the reflection plate of FIG. 8.

FIG. 9 is a sectional view of the reflection plate 64 of FIG. 8. Referring to FIG. 9, the concave reflective surfaces 81 and 82 of the reflection plate 64 have a curvature radius R1. Preferably, but not necessarily, the concave reflective surfaces 81 and 82 have a curvature radius R1 of about 9mm. A straight line extending from the center of arc of the concave reflective surface 81 to the center point in the arc range of the concave reflective surface 81 forms an angle θ1 with a straight line vertically extending from the center point in the arc range of the concave reflective surface 81. As a result, the reflective surface 81 is slightly inclined to the horizontal plane when viewing it from the front.

Likewise, a straight line extending from the center of arc of the concave reflective surface 82 to the center point in the arc range of the concave reflective surface 82 forms an angle θ2 with a straight line vertically extending from the center point in the arc range of the concave reflective surface 82. As a result, the reflective surface 82 is also slightly inclined to the horizontal plane when viewing it from the front. The angles θ1 and θ2 may be the same or slightly different depending on the design and specification of the video presenter. With the inclination of the reflective surfaces 81 and 82 to the horizontal plane, it is possible to avoid concentrating of the light reflecting from the reflection plate onto a portion of the target object and enables to distribute the light evenly there-around.

Figure 10:
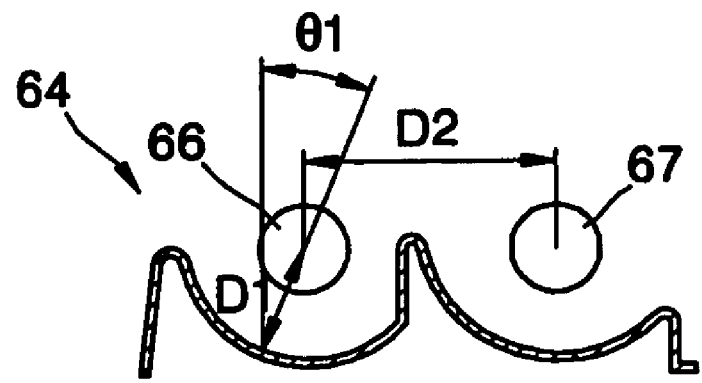
FIG. 10 is a cross-sectional view of the reflection plate of FIG. 9 with a couple of lamps coupled thereto.

FIG. 10 is a sectional view of the reflection plate 64 of FIG. 9 with the first and second lamps 66 and 67 positioned there-above. As shown in the figure, the slanted line, which passes though the respective center of the first and second lamps 66 and 67 and the respective center point in the arc range of the reflective surfaces 81 and 82, and the vertical line, which passes though the respective center point in the arc range of the reflective surfaces 81 and 82, forms an angle θ1 (and/or θ2 as discussed above). A distance between the respective center of the first and second lamps 66 and 67 and the respective center point in the arc range of the reflective surfaces 81 and 82, is shown with D1. A distance between the centers of the first and second lamps 66 and 67 is shown with D2. According to one embodiment of the invention, θ1 (and/or θ2) is preferably about 20°, D1 is about 5 mm, and D2 is about 17 mm.

Figure 11:
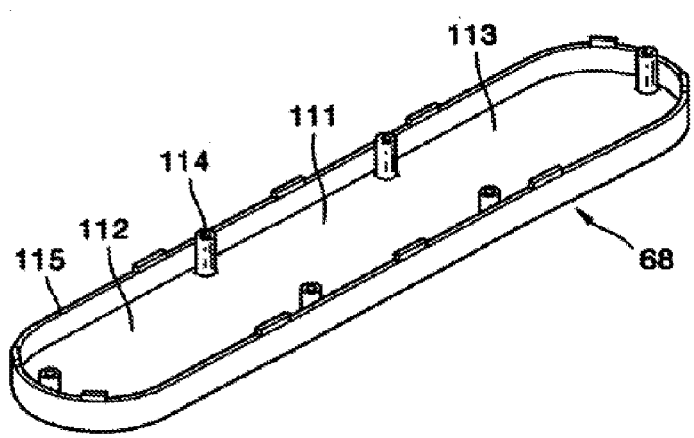
FIG. 11 is a perspective view of the lamp cover of FIG. 6, which is turned upside down from FIG. 6.

FIG. 11 is a perspective view of the lamp cover 68 of FIG. 6, which is shown upside down. Referring to FIG. 11, the lamp cover 68 includes an inner surface, which is composed of a first inner surface 111, a second inner surface 112, and a third inner surface 113, a rim portion 115, which surrounds the inner surface, and screw holes 114, which are formed along the rim portion 115. The lamp cover 68 can be coupled to the lamp base 63 by screwing screws through the screw holes 114.

The portions in the first, second, and third inner surfaces 111, 112, and 113 are formed of a transparent, semi-transparent, or translucent material so that light emitting from the first and second lamps 66 and 67 can pass them through. The first inner surface 111 is disposed in the middle of the lamp cover 68, and the second and third inner surfaces 112 and 113 are disposed at either side of the first inner surface 111.

The first, second, and third inner surfaces 111, 112, and 113 of the lamp cover 68 are formed as curved surfaces with different radiuses of curvature so that light passing through the lamp cover 68 can be evenly distributed over a target object, or can illuminate a marginal portion of the target object more brightly than a central portion of the target object, rather than being concentrated on the central portion of the target object, which will be described later in further detail.

Figure 12:
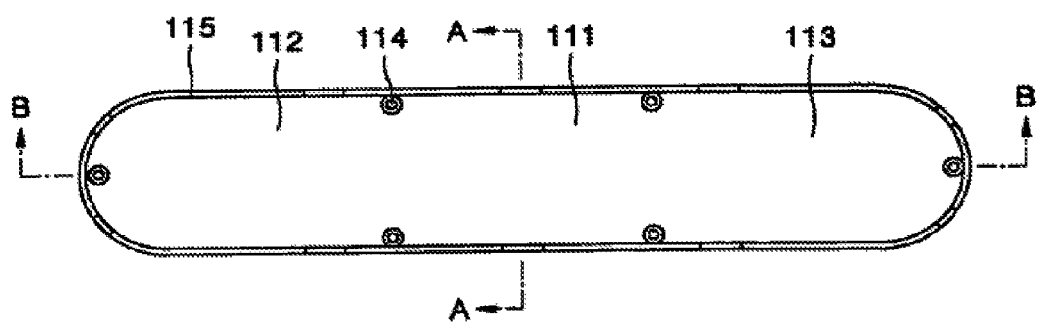
FIG. 12 is a plan view of the lamp cover of FIG. 11.
Figure 13:
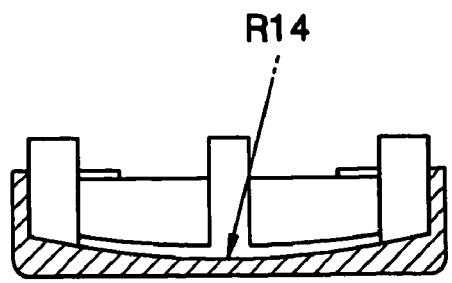
FIG. 13 is a cross-sectional view of the lamp cover of FIGS. 11 and 12 taken along line A-A of FIG. 12.
Figure 14:
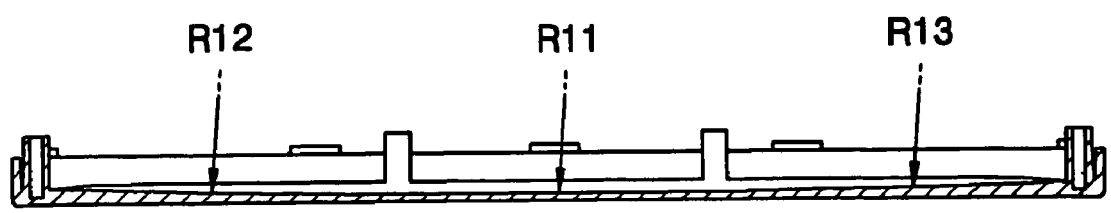
FIG. 14 is a cross-sectional view of the lamp cover of FIGS. 11 and 12 taken along line B-B of FIG. 12.

FIG. 12 is a plan view of the lamp cover 68. FIG. 13 is a cross-sectional view of the lamp cover 68 taken along line A-A of FIG. 12, and FIG. 14 is a cross-sectional view of the lamp cover 68 taken along line B-B of FIG. 12.

Referring to FIG. 13, the lamp cover 68 has a curvature radius R14. Referring to FIG. 14, the first inner surface 111 has a curvature radius R11, the second inner surface 112 has a curvature radius R12, and the third inner surface 113 has a curvature radius R13. Here, the curvature radiuses R11, R12, and R13 may be the same or may be different from one another. Preferably, but not necessarily, R12 and R13 are the same, and R11 is different from R12 and R13. Alternatively, R11, R12, and R13 may be different from one another. Typically, R11, R12, and R13 can be different depending on the design of the video presenter. As described above, the inner surface of the lamp cover 68 is divided into three parts preferably with varying or different curvature radiuses, thereby enabling even or optimized distribution of light passing through the lamp cover 68 to the object surface or illuminating a marginal portion of the object more brightly than a central portion of the object while preventing the light passing through the lamp cover 68 from being concentrated on the central portion of a target object.

Figure 15:
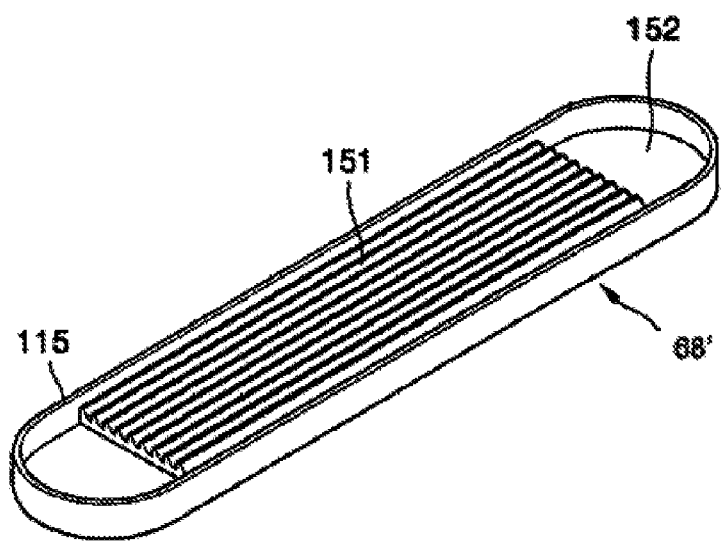
FIG. 15 is a perspective view of another embodiment of the lamp cover of the present invention.

FIG. 15 is a perspective view of another embodiment of the lamp cover with a structure modified from the lamp cover 68 of FIG. 6. Referring to FIG. 15, a lamp cover 68' includes a plurality of parallel prisms 151 formed on an inner surface 152 of the lamp cover 68'. A rim portion 115 is formed surrounding the inner surface 152.

The prisms 151 extend along the longitudinal direction of the lamp cover 68' and have a predetermined cross-sectional shape. Light emitting from the first and second lamps 66 and 67 is refracted when it passes through the prisms 151. Accordingly, it is possible to more evenly distribute light over a target object or illuminate a marginal portion of the target object more than a central portion of the target object while preventing the light from being concentrated upon the central portion of the target object.

Figure 16:
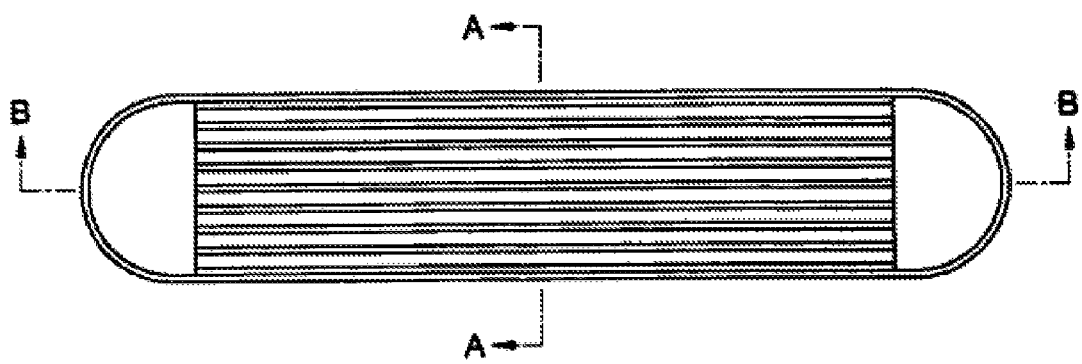
FIG. 16 is a plan view of the lamp cover of FIG. 15.
Figure 17:
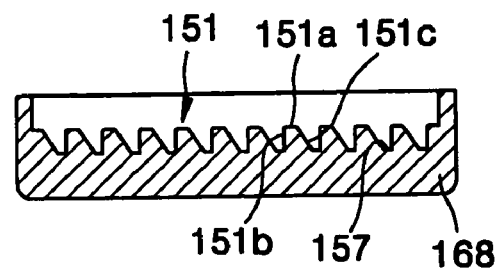
FIG. 17 is an enlarged cross-sectional view of the lamp cover of FIG. 15 taken along line A-A of FIG. 16.

FIG. 16 is a plan view of the lamp cover 68' of FIG. 15. FIG. 17 is an enlarged cross-sectional view of the lamp cover 68' of FIG. 15 taken along line A-A of FIG. 16, and FIG. 18 is a cross-sectional view of the lamp cover 68' of FIG. 15 taken along line B-B of FIG. 16.

Referring to FIG. 17, each of the prisms 151 is composed of a horizontal surface 151a, a vertical surface 151b, which vertically extends downward from one end of the horizontal surface 151a, and a slanting surface 151c, which slantingly extends downward from the other end of the horizontal surface 151a. A connection surface 157 is formed to connect every two adjacent prisms 151.

Light incident upon the slanting surface 151c of each of the prisms 151 is refracted when it passes through an outer surface 168 of the lamp cover 68'. Accordingly, it is possible to more evenly distribute light over a target object or illuminate a marginal portion of the target object more than a central portion of the target object while preventing the light from being concentrated upon the central portion of the target object.

Figure 18:
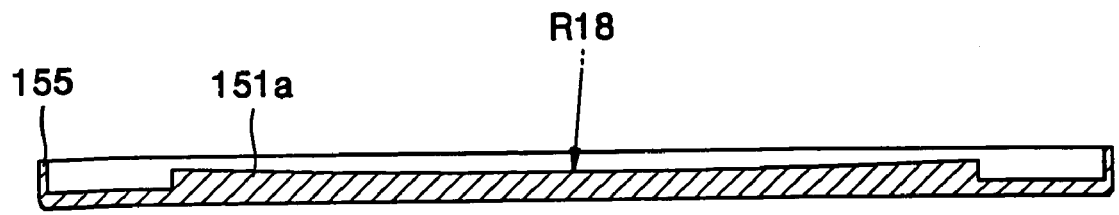
FIG. 18 is a cross-sectional view of the lamp cover of FIG. 15 taken along line B-B of FIG. 16.

Referring to FIG. 18, the horizontal surface 151a of each of the prisms 151, which are formed along the longitudinal direction of the lamp cover 68', may be a curved surface having a curvature radius R18.

Figure 19:
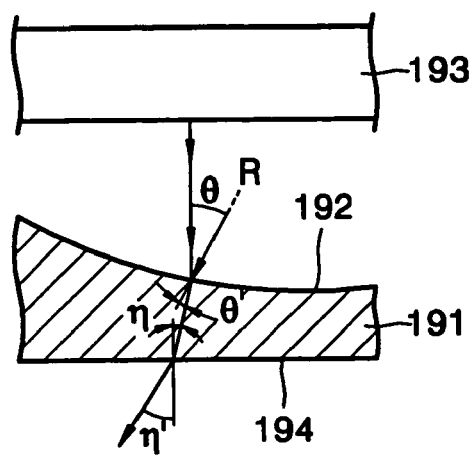
FIG. 19 is a diagram illustrating how light passing through the lamp cover of FIG. 6 can be distributed evenly.

FIG. 19 is a diagram illustrating how light passing through the lamp cover 68 of FIG. 6 can be evenly distributed. Referring to FIG. 19, an inner surface 192 of a lamp cover 191 is formed to have a curvature radius R. Light emitted from a lamp 193 is incident upon the inner surface 192 with an incidence angle θ and then is refracted with a refraction angle θ' when passing through the inner surface 192. Then, the light is incident upon an outer surface 194 of the lamp cover 191 with an incidence angle η with respect to a vertical line drawn from the outer surface 194 and is refracted again with a refraction angle η' with respect to the vertical line drawn from the outer surface 194 when passing through the outer surface 194. Here, the incidence angles θ and η and the refraction angles θ' and η' can be calculated by using Snell's Law.

In short, the light emitted from the lamp 193 is incident upon the inner surface 192 having the curvature radius R with the incidence angle θ and is refracted with the refraction angle η' with respect to the vertical line drawn from the outer surface 194 when the light passes through the outer surface 194. Therefore, the light emitting from the lamp 193 can be prevented from being concentrated upon a central portion of the target object, which is located closest to the center of the lamp cover 191, and more light emitting from the lamp 193 can be incident upon marginal portions of a target object, rather than upon the central portion of the target object. Even though more light emitting from the lamp 193 is incident upon the marginal portions of the target object, the central portion of the target object can be sufficiently illuminated because the central portion of the target object is closer than the marginal portions of the target object to the center of the lamp cover 191. The marginal portions of the target object can be illuminated more than or at least as much as the central portion of the target object because the intensity of illumination at the marginal portions of the target object is enhanced by the refraction of light as described above. It is possible to more evenly distribute the light emitting from the lamp 193 over the target object by forming the lamp cover 191 to have inner surfaces with varying curvature radius or with several different curvatures as in the first, second, and third inner surfaces 111, 112, and 113 as illustrated in connection with FIG. 14.

Figure 20:
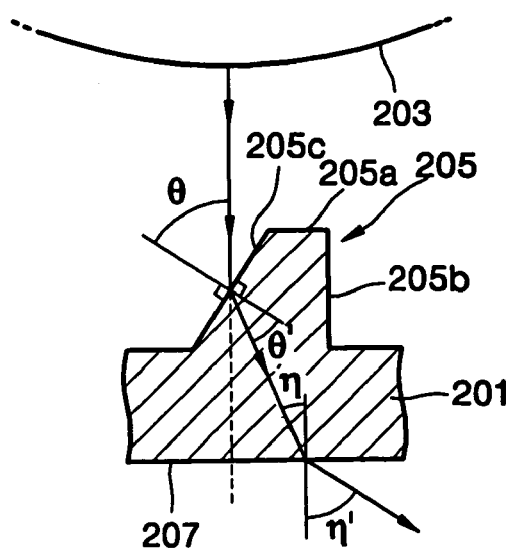
FIG. 20 is a diagram illustrating how light passing through the lamp cover of FIG. 15 can be distributed evenly.

FIG. 20 is a diagram illustrating how light passing through the lamp cover 68' of FIG. 15 can be evenly distributed. Referring to FIG. 20, a prism 205 is formed on an inner surface of a lamp cover 201. The prism 205 comprises a horizontal surface 205a, a vertical surface 205b, which vertically extends downward from one end of the horizontal surface 205a, and a slanting surface 205c, which slantingly extends downward from the other end of the horizontal surface 205a. Light emitting from a lamp 203 is incident upon the slanting surface 205c with an incidence angle θ with respect to a vertical line drawn from the horizontal surface 205a and then is refracted with a refraction angle θ' when passing through the slanting surface 205c. Then, the light is incident upon an outer surface 207 of the lamp cover 201 with an incidence angle η and is refracted again with a refraction angle η' with respect to a vertical line drawn from the outer surface 207 when passing through the outer surface 207. In short, the light emitting from the lamp 203 is incident upon the slanting surface 205c with the incidence angle θ and is refracted with the refraction angle η' with respect to the vertical line drawn from the outer surface 207 when it passes through the outer surface 207.

As illustrated in FIG. 20, the lamp cover 201, on which the prism 205 is formed, distributes more light to marginal portions of a target object, rather than concentrating upon a central portion of the target object. Therefore, the lamp cover 201, like the lamp cover 191 of FIG. 19, can enhance the intensity of illumination at the marginal portions of the target object without concentrating light upon the central portion of the target object.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A video presenter for inputting a video image of an object comprising:
    a table;
    a support arm extending generally upwardly and rotatably coupled to the table, the support arm having a generally arch-like shape;
    a camera head rotatably attached at an upper end of the support arm; and
    an illumination device including a lamp holder attached at the inwardly facing surface of the generally arch shaped support arm, the lamp holder including a planar outer surface facing towards the table, and a lamp unit rotatably coupled to the planar outer surface of the lamp holder to provide illumination towards the table in an adjustable manner such that the lamp unit is adjustable between a first position parallel to the lamp holder, in an orientation angled towards an upper surface of the table and with a front face of the lamp unit directing towards the upper surface of the table, and a second position perpendicular to the lamp holder, in an orientation parallel with respect to the upper surface of the table and with the front face of the lamp unit directing towards the upper surface of the table to distribute illumination light over the upper surface of the table more evenly.

2. The video presenter of claim 1, wherein the table has a generally circular and flat shape.

3. The video presenter of claim 2, further comprising a supporting base at a lateral side of the table, and wherein the support arm is rotatably coupled to the supporting base.

4. The video presenter of claim 1, wherein the lamp holder includes a convex outer surface opposite to the planar outer surface of the lamp holder, the convex outer surface corresponding to a concave surface of the inwardly facing surface of the generally arch shaped support arm such that the lamp holder is attached to the support arm with the convex outer surface of the lamp holder abutting the concave surface of the generally arch shaped support arm.

5. The video presenter of claim 1, wherein the lamp unit includes a lamp cover formed of a substantially transparent or translucent material.

6. The video presenter of claim 5, wherein the lamp cover has an inner surface with varying or different radiuses of curvature.

7. The video presenter of claim 6, wherein the curved inner surface of the lamp cover is a concave surface.

8. The video presenter of claim 6, wherein the varying or different curvature of the lamp cover is arranged along a longitudinal direction of the lamp cover, and the curvature at a central portion of the lamp cover is different from the curvature two lateral portions of the lamp cover.

9. The video presenter of claim 6, wherein the varying or different curvature of the lamp cover is determined so that light from the lamp unit can be distributed over a target object on the table with a substantially uniform illumination intensity.

10. The video presenter of claim 5, wherein the lamp unit further includes:
    a lamp base coupled to the lamp cover so that an empty space is formed there-between;
    a reflection plate installed in the empty space formed between the lamp base and the lamp cover and, the reflection plate having a pair of concave reflective surfaces; and
    a pair of lamps disposed about the respective concave reflective surfaces.

11. The video presenter of claim 10, wherein each of the pair of concave reflective surfaces of the reflection plate is formed so that a straight line extending from the center of curvature of the concave reflective surface to the center point in the arc range of the corresponding concave reflective surface tilts by a degree with respect to a straight line vertically extending from the center point in the arc range of the corresponding concave reflective surface.

12. The video presenter of claim 10, wherein each of the lamps is arranged so that the center of the lamp tilts with respect to a straight line vertically extending from the center point in the arc range of the respective concave reflective surfaces.

13. The video presenter of claim 10 further comprising:
a rotator coupled to the lamp holder and the lamp unit for enabling rotation of the lamp unit relative to the lamp holder; and
a stopper coupled to the rotator and configured to provide limits on the rotation of the lamp unit relative to the lamp holder.

14. The video presenter of claim 10, wherein the lamps are cold cathode fluorescent lamps.

15. The video presenter of claim 5, wherein the lamp cover has a plurality of prisms formed at an inner surface of the lamp cover.

16. The video presenter of claim 15, wherein each of the prisms comprises a horizontal surface, a vertical surface vertically extending downward from one side of the horizontal surface, and a slanting surface slantingly extending downward from the other side of the horizontal surface.

17. The video presenter of claim 15, wherein a cross-sectional shape of each of the prisms is determined so that light from the lamp unit can be distributed over a target object on the table with a substantially uniform illumination intensity.

18. An illumination device for a video presenter, comprising:
a lamp holder having a lamp holder base with a convex outer surface, and a lamp holder cover coupled to said lamp holder base and providing a flat surface; and
a lamp unit having a lamp base rotatably coupled to the lamp holder cover, a lamp cover coupled to the lamp base so that an empty space is formed there-between, the lamp cover having a curved inner surface with a varying radius of curvature, a reflection plate installed in the empty space formed between the lamp base and the lamp cover, the reflection plate having a pair of concave reflective surfaces, and a pair of lamps respectively disposed on the concave reflective surfaces.

19. The illumination device of claim 18 further comprising:
a rotator coupled to the lamp holder and the lamp unit for enabling rotation of the lamp unit relative to the lamp holder; and
a stopper coupled to the rotator and configured to provide limits on the rotation of the lamp unit relative to the lamp holder.

20. An illumination device for a video presenter, comprising:
a lamp holder having a lamp holder base with a curved outer surface, and a lamp holder cover coupled to the lamp holder base and providing a flat surface; and
a lamp unit having a lamp base rotatably coupled to the lamp holder cover, a lamp cover coupled to the lamp base so that an empty space is formed there-between, the lamp cover having a plurality of prisms formed on an inner surface thereof, a reflection plate installed in the empty space formed between the lamp base and the lamp cover, the reflection plate having a pair of concave reflective surfaces, and a pair of lamps respectively disposed on the concave reflective surfaces.

21. The illumination device of claim 20 further comprising:
a rotator coupled to the lamp holder and the lamp unit for enabling rotation of the lamp unit relative to the lamp holder; and
a stopper coupled to the rotator and configured to provide limits on the rotation of the lamp unit relative to the lamp holder.

22. A video presenter for inputting a video image of an object comprising:
a table;
a support arm extending generally upwardly and having a generally arch-like shape;
a camera head attached at an upper end of the support arm; and
an illumination device including a lamp unit with its length larger than its width, the lamp unit rotatably coupled at an inwardly facing surface of the generally arch shaped support arm and facing towards the table to provide illumination towards the table in an adjustable manner such that the lamp unit is adjustable between a first position parallel to the lamp holder, in an orientation angled towards an upper surface of the table and with a front face of the lamp unit directing towards the upper surface of the table, and a second position perpendicular to the lamp holder, in an orientation parallel with respect to the upper surface of the table and with the front face of the lamp unit directing towards the upper surface of the table to distribute illumination light over the upper surface of the table more evenly.

23. The video presenter of claim 22, wherein the illumination device further includes a lamp holder, the lamp holder having a planar outer surface facing toward the table, and the lamp unit rotatably coupled to the planar outer surface of the lamp holder.

24. The video presenter of claim 22, wherein the support arm is rotatably coupled to the table, and the camera head is rotatably attached to the support arm.

* * * * *